United States Patent
Miyata (10) Patent No.: US 10,810,970 B1
(45) Date of Patent: Oct. 20, 2020

(54) DISPLAY DEVICE

(71) Applicant: SHARP KABUSHIKI KAISHA, Sakai, Osaka (JP)

(72) Inventor: Hidekazu Miyata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/496,226

(22) PCT Filed: Mar. 22, 2018

(86) PCT No.: PCT/JP2018/011295
§ 371 (c)(1),
(2) Date: Sep. 20, 2019

(87) PCT Pub. No.: WO2018/180843
PCT Pub. Date: Oct. 4, 2018

(30) Foreign Application Priority Data

Mar. 29, 2017 (JP) .................................. 2017-065357

(51) Int. Cl.
*G09G 5/10* (2006.01)

(52) U.S. Cl.
CPC ....... *G09G 5/10* (2013.01); *G09G 2320/0626* (2013.01); *G09G 2320/0686* (2013.01); *G09G 2354/00* (2013.01)

(58) Field of Classification Search
CPC .............. G09G 5/10; G09G 2300/0465; G09G 2320/0686
See application file for complete search history.

(56) References Cited

U.S. PATENT DOCUMENTS

| | | | |
|---|---|---|---|
| 2013/0223531 A1* | 8/2013 | Garbas ................. | H04N 19/136 375/240.14 |
| 2014/0168056 A1* | 6/2014 | Swaminathan ......... | G06F 3/147 345/156 |
| 2015/0304625 A1* | 10/2015 | Seto ..................... | H04N 13/128 348/44 |
| 2016/0099299 A1* | 4/2016 | Chung ............. | H01L 29/41733 257/40 |
| 2018/0063380 A1* | 3/2018 | Shida ..................... | G06T 7/136 |

FOREIGN PATENT DOCUMENTS

JP    2016-024772 A    2/2016

* cited by examiner

*Primary Examiner* — Phi Hoang
(74) *Attorney, Agent, or Firm* — ScienBiziP, P.C.

(57) ABSTRACT

A luminance difference in an image displayed on an area of interest is easily recognized in a manner free from the effect of luminance of an area surrounding the area of interest. An HDR display (100) includes an image processing unit (14). If the number of digits of a difference between a luminance center value of a luminance distribution in the area of interest in a display unit (20) and a luminance center value of a luminance distribution in an entire display region is 2 digits or more, the image processing unit (14) performs a luminance conversion on the luminance value of each pixel in an entire screen in a manner such that the luminance center value of the luminance distribution in the entire display region approaches the luminance center value of the luminance distribution in the area of interest.

11 Claims, 9 Drawing Sheets

| | Hybrid Log-Gamma | Perceptual Quantizer |
|---|---|---|
| REFERENCE STANDARDS | ARIB STD-B67 | SMPTE ST 2084 |
| CONCEPT | · LUMINANCE VALUE IS RELATIVELY HANDLED (AS IN RELATED ART)<br>· GAMMA CURVE COMPATIBLE WITH RELATED-ART TELEVISION | · MAXIMUM LUMINANCE OF 10,000 cd/m² IS HANDLED AS ABSOLUTE LUMINANCE<br>· NEW GAMMA CURVE BASED ON HUMAN VISION CHARACTERISTICS |
| VIDEO SIGNAL | · CORRELATION BETWEEN "BLACK" AND "WHITE"<br>CODE 64 (10 BITS) IS "BLACK".<br>CODE 940 (10 BITS) IS "PEAK WHITE". | · DEFINING RELATIONSHIP BETWEEN CODE VALUE AND ABSOLUTE LUMINANCE VALUE<br>CODE 64 (10 BITS) IS 0.01 cd/m²<br>CODE 1019 (10 BITS) IS 10,000 cd/m² |
| DEFINITION | DEFINING OETF (ON CAMERA SIDE) | DEFINING EOTF (ON DISPLAY SIDE) |
| PEAK LUMINANCE | REPRODUCING "BLACK" TO "WHITE" IN ACCORDANCE WITH DISPLAY PERFORMANCE | SIGNAL CONVERSION IN ACCORDANCE WITH PEAK LUMINANCE |

FIG. 4

$$E' = \begin{cases} r\sqrt{L} & 0 \leq L \leq 1 \\ a\ln(L-b) + c & 1 < L \end{cases}$$

ADJUSTMENT IS MADE SUCH THAT SIGNAL OF HDR IS 0.5 WITH LUMINANCE VALUE 1 OF REFERENCE WHITE AT SDR. UP TO LUMINANCE VALUE OF 1, COMPATIBLE WITH CURVE HAVING 50% LUMINANCE AT SDR.

DISPLAY DEVICE

TECHNICAL FIELD

The present invention relates to display devices, in particular, to a display device displaying at HDR (High Dynamic Range).

BACKGROUND ART

If a high-luminance area and a low-luminance coexist in a display region of a display device, such as a liquid-crystal display device, a luminance difference is difficult to recognize in the low-luminance area generally because of vision characteristics of humans, in particular, because of adaptations of the eyes to light.

For example, Patent Literature 1 discloses a technique that makes the low-luminance area easier to be recognized by adjusting a value of gradation in the low-luminance area if a user looks at the low-luminance area in the display region where the high-luminance area and the low-luminance area coexist.

CITATION LIST

Patent Literature

PTL 1: Japanese Unexamined Patent Application Publication No. 2016-24772 (published Feb. 8, 2016)

SUMMARY OF INVENTION

Technical Problem

As in the technique disclosed in PTL 1, a display device having a maximum luminance of 1000 nits or higher, such as an HDR (High Dynamic Range) display device, is affected by luminance in the high-luminance area even if the gradation value is adjusted in the low-luminance area, and a luminance difference is difficult to recognize in the low-luminance area.

Since the technique disclosed in PTL 1 corrects an image only within an area of interest, a display gradation value in the area of interest becomes unnatural with respect to an entire screen. In particular, a display supporting HDR having higher luminance lacks the degree of contrast in a display in the area of interest within the low-luminance area. Specifically, the image displayed becomes unnatural.

A display device having a maximum luminance of 1000 nits or higher, such as an HDR (High Dynamic Range) display device, is affected by luminance of the environment if an image displayed in the area of interest that the user observes has luminance lower than luminance in an area surrounding the area of interest, and a luminance difference is difficult to recognize in the image displayed in the area of interest.

It is an object of an embodiment of the present invention to provide a display device that is not affected by the luminance of the area surrounding the area of interest, is able to easily recognize the luminance difference in the image displayed in the area of interest, and displays an image free from unnaturalness.

Solution to Problem

To solve the above problem, a display device of an embodiment of the present invention includes a display panel, an area of interest identifying unit that identifies, out of a display region of an entire display screen of the display panel, an area of interest that a user watches, and a display controller that, if a number of digits of a difference between a luminance center value of a luminance distribution in the area of interest identified by the area of interest identifying unit and a luminance center value of a luminance distribution in the display region of the entire display screen is equal to or above a predetermined number of digits, performs a luminance conversion on a luminance value of each pixel in as entire screen in a manner such that the luminance center value of the luminance distribution in the display region of the entire display screen approaches the luminance center value of the luminance distribution in the area of interest. The luminance center value of the luminance distribution in the area of interest indicates a mean value of luminance values of all pixels in the area of interest and the luminance center value of the luminance distribution in the display region of the entire display screen indicates a mean value of luminance values of all pixels in the entire screen.

Advantageous Effects of Invention

The advantage of the embodiment of the present invention lies in that in a manner free from luminance of an area surrounding an area of interest a luminance difference in an image displayed in the area of interest is easily recognized and the image free from unnaturalness is thus displayed in a manner free from.

BRIEF DESCRIPTION OF DRAWINGS

FIG. 7 illustrates graphs of luminance value conversion in a luminance distribution in which the mean luminance of as area of interest is lower than the mean luminance of a display region in an entire di pi y screen, wherein FIG. 7(a) illustrates the graph prior to the luminance value conversion and FIG. 7(b) illustrates the graph subsequent to the luminance value conversion.

FIG. 8 illustrates graphs of luminance value conversion in a luminance distribution in which the mean luminance of the area of interest is higher than the mean luminance of the display region in the entire display screen, wherein FIG. 8(a) illustrates the graph prior to the luminance value conversion and FIG. 8(b) illustrates the graph subsequent to the luminance value conversion.

DESCRIPTION OF EMBODIMENTS

First Embodiment

Embodiments of the present invention are described in detail. In a first embodiment, the display device of the present invention is an HDR (High. Dynamic Range) display.

Brief Description of the HDR Display

Figure 1:
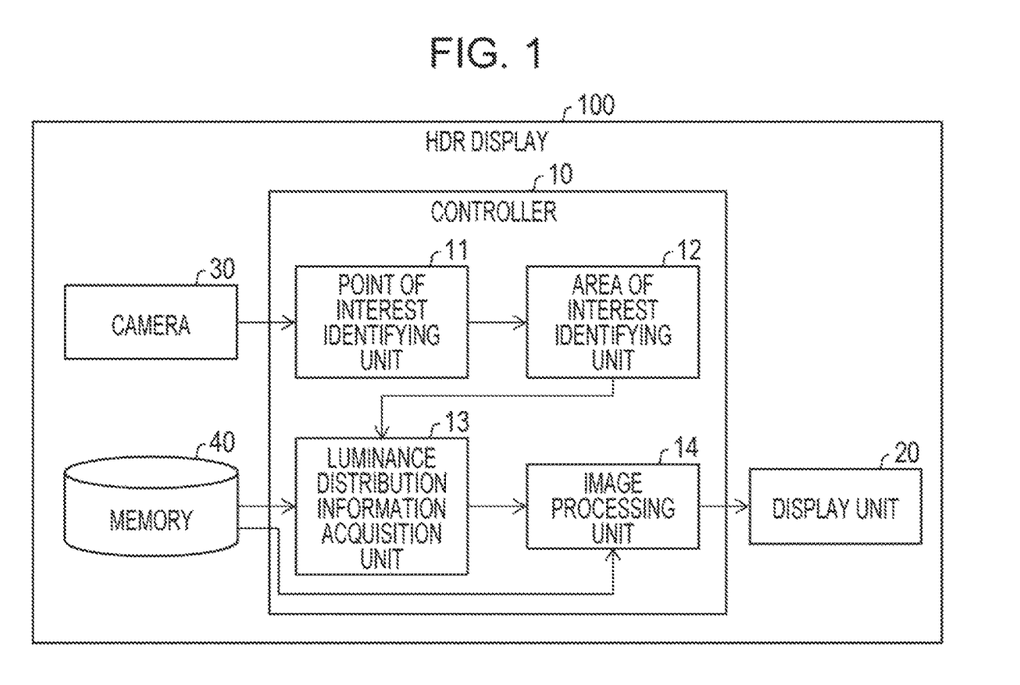
FIG. 1 is a schematic block diagram of an HDR display of an embodiment.

FIG. 1 is a schematic block diagram of an HDR display 100 of the embodiment.

Figure 2:
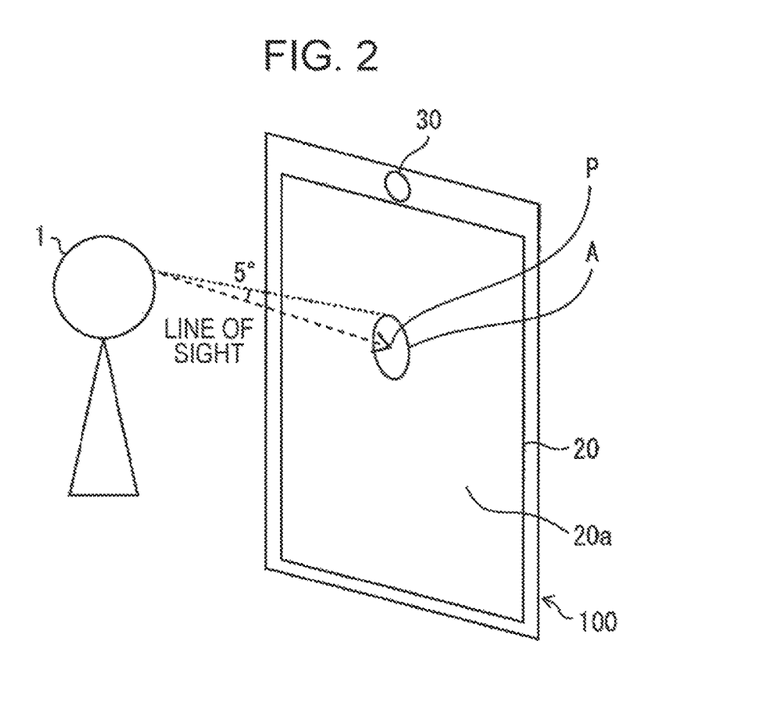
FIG. 2 illustrates the HDR display in FIG. 1 that a user watches.

FIG. 2 illustrates the HDR display 100 in FIG. 1 that a user watches.

The HDR display 100 is high dynamic range (HDR) display that displays an image at high luminance. Referring to FIG. 1, the HDR display 100 includes a controller 10 (image processing device), a display unit 20, a camera 30, and a memory 40. The controller 10 is described below.

The HDR display 100 may be a portable information terminal, such as a PC (Personal Computer), a multi-function portable phone (smart phone), or a table, or a television or the like.

The display unit 20, controlled by the controller 10, displays an image and, for example, includes a liquid-crystal panel or the like.

The camera 30 includes an imaging device, such as a CCD (charge coupled device) camera, and is mounted on the top center edge portion of the HDR display 100 as illustrated in FIG. 2. The camera 30 has desirably an angle of view that allows the camera 30 to photograph at least the expression of the eyes of a user 1 who is watching the HDR display 100.

The memory 40 stores a variety of control programs executed by the controller 10. For example, the memory 40 includes a non-volatile memory, such as a hard disk or a flash memory. The memory 40 stores image data used to display an image on the display unit 20 and other data.

In accordance with the embodiment, the controller 10 reads from the memory 40 image data indicating a still image. The present invention is not limited to reading the still image. Alternatively, the memory 40 may store video data indicating a video and the controller 10 may read the video data.

The image data or video data may not necessarily be stored on the memory 40 in advance. The image data or video data may be acquired by receiving a broadcast wave or may be acquired from an external device (such as a recording device) that is connected to the HDR display 100 and stores or generates the image data or video data.

Detail of the Controller 10

The controller 10 controls the whole HDR display 100. In accordance with the embodiment, as illustrated in FIG. 2, the controller 10 has a function of identifying a point P that the user 1 watches out of a display region 20a of the display unit 20 in the HDR display 100 and identifying from the identified point P an area (area of interest) A that the user 1 watches. The controller 10 further has a function of correcting display gamma in accordance with a luminance distribution in an image di played in the identified area of interest. Specifically, as illustrated in FIG. 1, the controller 10 includes a point of interest identifying unit 11, area of interest identifying unit 12, luminance distribution information acquisition unit 13, and image processing unit (display controller) 14. The process performed by these elements of the controller 10 is performed when the number of viewers is one. If the HDR display 100 determines with a face detection function thereof that multiple viewers watch the display unit 20, the HDR display 100 does not perform the process.

In response to the image data captured by the camera. 30 (the image data obtained as a result of capturing at least the expression of the eyes of the use the point of interest identifying unit 11 recognizes the user 1 who is watching the display unit 20, identifies the location of the eyeballs of the recognized user 1, tracks the line of sight of the user 1 in response to the location of the eyeballs, and identifies the point of interest (a point of interest P) in the display region 20a of the display unit 20. The tracking of the line of sight of the user 1 is performed as below. The camera 30 images the eyes of the user 1, a reference point in the captured image of the eyes of the user 1 is set to be the inner corner of the eye, a moving point is set to be the iris, and the line of sight of the user 1 is detected based on the location of the iris with respect to the inner corner of the eye. If the iris of the left eye is apart from the inner corner of the left eye, the user 1 is determined to look leftward. If the iris of the left eye is closer to the inner corner of the left eye, the user 1 is determined to look rightward. The coordinates of the point of interest P are identified by tracking the line of sight of the user 1 in this way and transferred to the area of interest identifying unit 12 arranged at a later stage.

The area of interest identifying unit 12 has a function of estimating a viewing distance (distance between the user and the HDR display 100) in advance from the image data obtained from the camera 30. For example, markers are displayed at the four corners and the central point of the display region 20a of the display unit 20, the user tracks the markers with the eyes, the movement of the eyeball (iris of the eye) is obtained as the image data, and the viewing distance is thus estimated from the image data. The area of interest identifying unit 12 identifies as the area of interest A the area within a predetermined viewing angle (here 5°) in the display region 20a of the display unit 20 from the estimated viewing distance and the coordinates of the point of interest P identified by the point of interest identifying unit 11. The reason why the viewing angle is set to be 5° is described later. The point of interest indicates the center line of sight on the screen that the user watches and the viewing angle indicates an angle made from the line of sight connecting the eyeball of the user to the point of interest.

The luminance distribution information acquisition unit 13 retrieves from the memory 40 luminance distribution information of the image displayed on the entire screen of the display unit 20 and luminance distribution information of the area of interest A and transfers the retrieved luminance distribution information to the image processing unit 14. The luminance distribution information of the entire screen indicates a distribution of the luminance values of all pixels on the entire screen and the luminance distribution information of the area of interest A indicates a distribution of luminance values of all pixels in the area of interest A.

If the number of digits of a difference between a luminance center value of a luminance distribution in the area of interest A identified by the area of interest identifying unit 12 and a luminance center value of a luminance distribution in the display region 20a of an entire display screen of the display unit 20 is equal to or above a predetermined number of (gits, the image processing unit 14 performs a luminance conversion on a luminance value of each pixel in the entire screen in a manner such that the luminance center value of the luminance distribution in the display region 20a of the entire display screen approaches the luminance center value at: the luminance distribution in the area of interest A. The luminance center value of the luminance distribution in the area of interest A indicates the mean value of the luminance values of all pixels in the area of interest A. The luminance center value of the luminance distribution in the display region 20a of the entire display screen indicates the mean value of the luminance values of all pixels in the entire screen.

Specifically, if the number of digits of the difference between the luminance center value of the luminance distribution in the area of interest A and the luminance center value of the luminance distribution in the display region 20a of the entire display screen is 2 or more, the image processing unit 14 performs the luminance conversion such that the luminance center value of the luminance distribution in the display region 20a of the entire display screen approaches the luminance center value of the luminance distribution in the area of interest A.

The predetermined number of digits may be desirably 2 or more but a predetermined number smaller than two may also be acceptable. The conversion process of the image processing unit 14 is described in detail later.

The image processing unit 14 transfers to the display unit 20 the image data of display gamma responsive to the converted luminance center value of the luminance distribution in the display region 20a of the entire display screen.

The display unit 20 displays the image data from the image processing unit 14. An image having a clear luminance difference not affected by the luminance of the display region 20a of the entire display screen is displayed in the area of interest A that the user watches. The clear luminance difference means that the image displayed is free from unnaturalness.

About HDR

Figure 3:
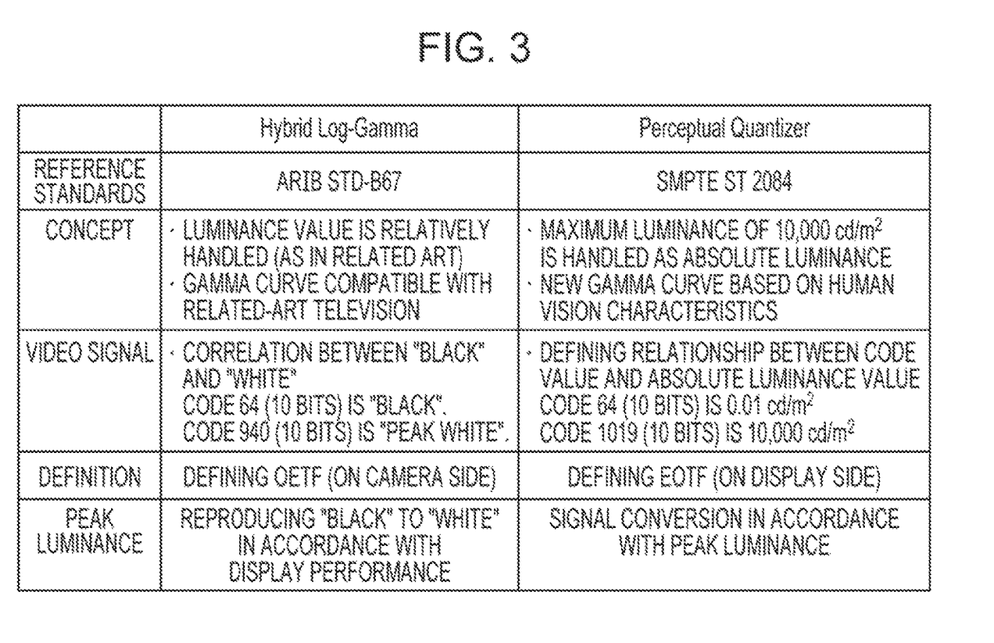
FIG. 3 illustrates a table listing HDR standards.

FIG. 3 is a table listing HDR standards.

Figure 4:
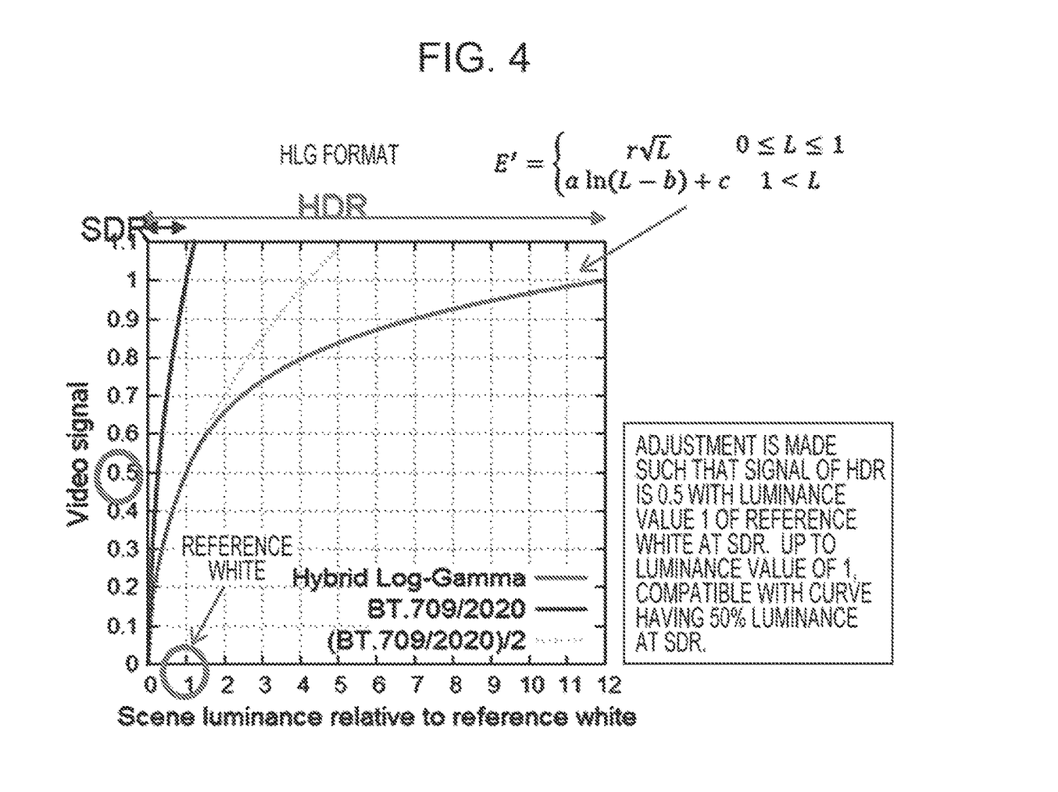
FIG. 4 is a graph of a photoelectric conversion function indicating a relationship between a video signal and luminance in HLG as one of the HDR standards.

FIG. 4 is a graph of a photoelectric conversion function indicating a relationship between a video signal and luminance in HLG as one of HDR standards.

Figure 5:
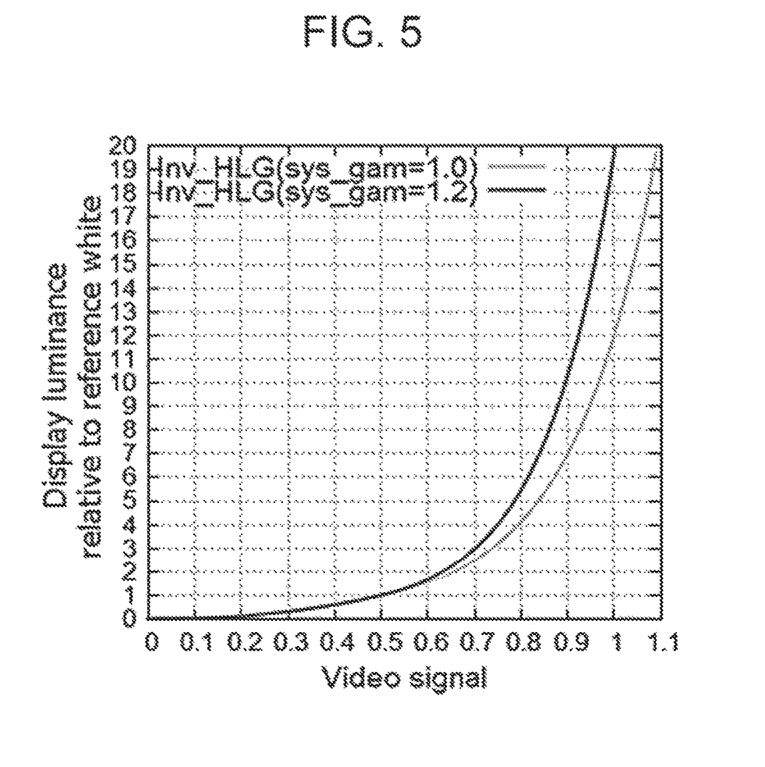
FIG. 5 is a graph of a photoelectric conversion function indicating a relationship between a video signal and luminance in the HLG as one of the HDR standards.

FIG. 5 is a graph of the photoelectric conversion function indicating a relationship between the video signal and the luminance in the HLG as one of HDR standards.

HDR for TV includes HLG (Hybrid Log-Gamma) and PQ (Perceptual Qauntizer) as illustrated in FIG. 3. The main difference from conventional TV method (SDR) lies in an expanded expression range from dark to light. Conventionally, output gamma is set with a monitor output considered to be 100 nits. The HDR standard allows luminance output of 1000 nits to 10000 nits to be output. HDR liquid-crystal display devices have the following specifications:
Maximum luminance: 1000 nits or higher, black luminance: 0.05 nits or lower,
Contrast ratio: 20000 to 1.

OLED display devices have the following specifications:
Maximum luminance: 540 nits or higher, black luminance: 0.0005 nits or lower,
Contrast ratio: 1080000 to 1.

The HDR display 100 of the embodiment is a liquid-crystal device or an OLED display device, each satisfying the above specifications. If a liquid-crystal device is used as the HDR display 100, a technique used to satisfy the above specifications is area active backlight that sets backlight to be local dimming.

HDR techniques for the TV recently standardized are in use. HDR techniques for PC displays have also been available. Specifically, HDR displays for personal use, namely, HDR displays for PCs (notebook PC and tablet PC) have been widely used.

If a video is displayed with dynamic range increased in the high luminance display for TV, the video has more sense of depth and display quality is thus increased. The same is true of the display for the PC. The display for the PC is different from the TV that displays an image on the entire screen thereof. The display of the PC pops up a variety of windows and displays a video together with Web information. The display of the PC is more versatile than the display of the TV.

It is known that the human vision characteristics are different from a light area to a dark area. In the dark area, the vision characteristics are not sufficient. If two videos that are different from each other in terms of the mean luminance and the luminance distribution are displayed in the HDR display having high luminance, humans are unable to view at optimal vision characteristics the video on a lower luminance side because of the influence of the luminance on a higher luminance side even though the human tries to watch the video (image) on the lower luminance side.

Area of Interest A

It is believed that the human vision characteristics responsive to a change in brightness covers 2 digits of dynamic range, 4 digits of dynamic range with the adaptation of the retina, and about. 1 digit with the adaptation of the pupil. In the screen with the ret Ana and pupil adapting, the dynamic range is about as high as 2 digits and if a difference of 2 digits is present between the luminance center value of the luminance distribution in the area of interest A and the luminance center value of the luminance distribution in the display region 20a of the entire display screen, the detail of the image in the area of interest A is difficult to recognize.

Concerning the area of interest A, the measured data about the density distribution of cones (Vision Information Processing Handbook, see page 237, edited by Vision Society of Japan) is available as information indicating the viewing angle characteristics of human vision. According to the disclosed data, the density at the center of a vision field, at 0°, is about $200 \times 10^3$/mm while the density at an angle about 5° is about one tenth of that density, namely, about $20 \times 10^3$/mm$^2$.

It is thus considered that the detail outside the area defined by an angle of 5° is almost unrecognizable (with the cone density of one tenth or less).

For this reason, displaying the area of interest (the area of interest A) in finer detail is considered to be useful in the display for personal use (such as the PC display).

Gradation Luminance Characteristics of HDR

Gradation (video signal) luminance characteristics of HDR are defined before describing the gamma conversion (gradation luminance characteristics conversion) method performed by the image processing unit 14. According to the HDR standards, the HLG and PQ formats are available as previously described and are different in characteristic definition. The HLG and PQ formats are identical in underlying idea. The characteristics of the HLG format are described herein.

The transfer function of the HLG format is defined as follows:

$$E'=r\sqrt{L}(0 \leq L \leq 1)$$

$$E'=a\ ln(L-b)+c(1<L)$$

where r represents a video signal level for a reference white level and r=0.5. L represents a voltage that is proportional to normalized input light to the camera 30 and E' represents a voltage that is proportional to a camera output as the video signal. Here, a, h, and c are constants and described below.

a=0.17883277
b=0.28466892
c=0.55991073

The transfer function graphs are illustrated in FIGS. 4 and 5.

SDR in the graph in FIG. 4 is short for Standard Dynamic Range and represents conventional standards. In the conventional standards, the reference white is 100 nits, namely, "reference white of 1"="100 nits". In the case of HDR, a video signal falling within a luminance range from 0 to 1200 nits is an incoming signal.

The image correction process using the gradation luminance conversion of the embodiment is described below.

Image Correction Process

Figure 6:
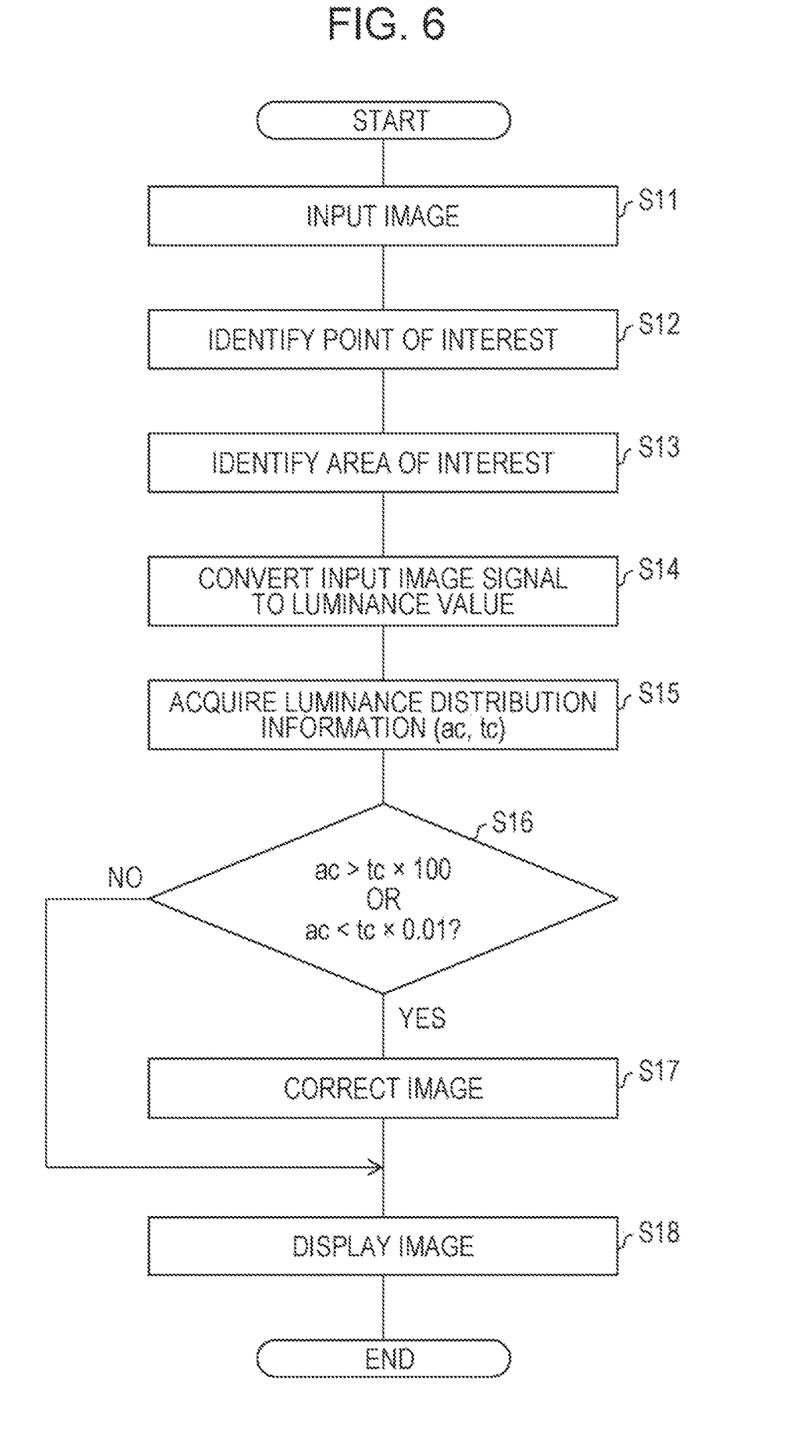
FIG. 6 is a flowchart illustrating an image correction process in the HDR display in FIG. 1.

FIG. 6 is a flowchart illustrating an image correction process.

Figure 7:
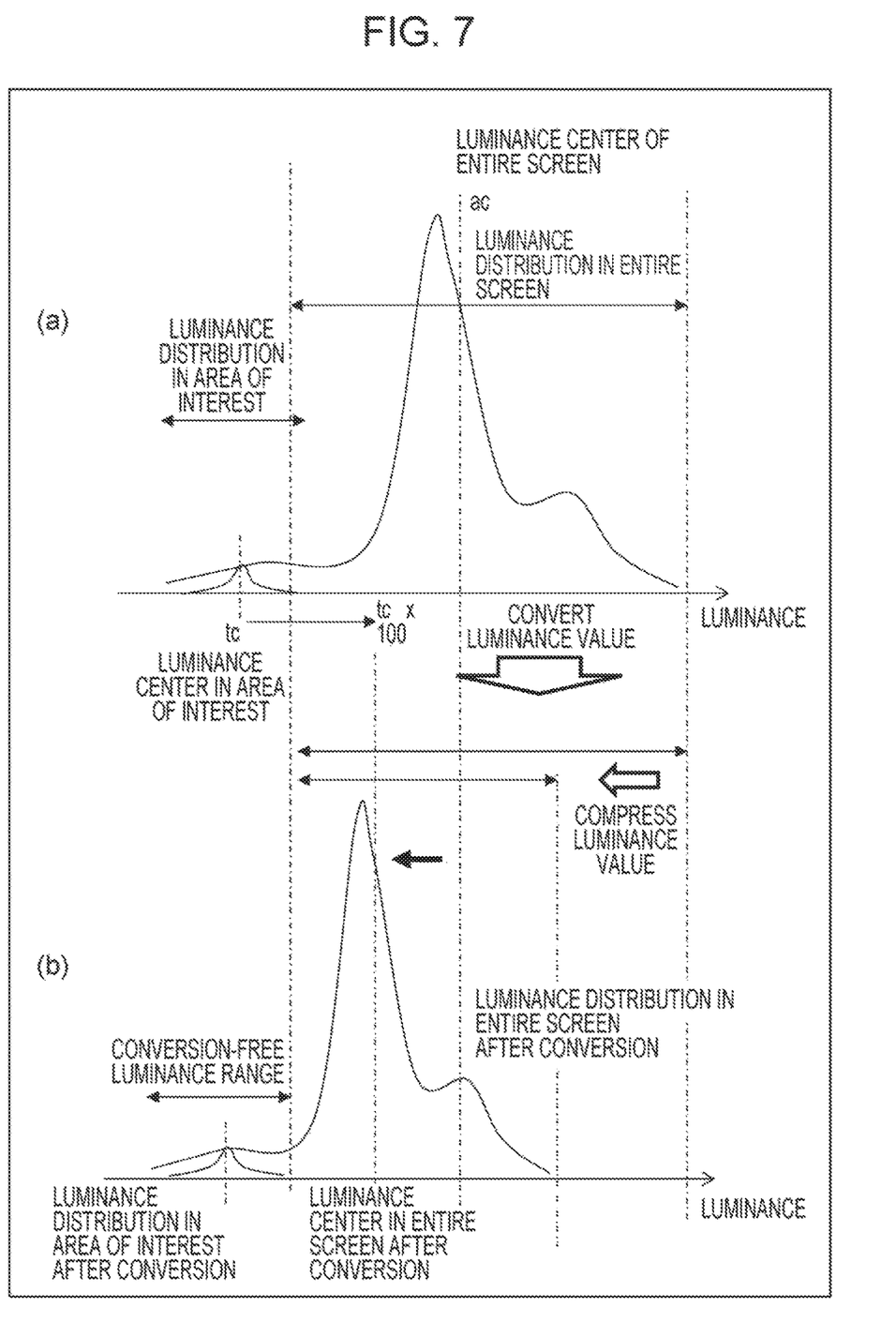

FIG. 7 illustrates graphs of luminance value conversion in a luminance distribution of the luminance distribution in which the mean luminance of the area of interest is lower than the mean luminance of the display region in the entire display screen, wherein FIG. 7(a) illustrates the graph of the luminance distribution in the entire screen prior to the luminance value conversion and FIG. 7(b) illustrates the graph of the luminance distribution in the entire screen subsequent to the luminance value conversion.

Figure 8:
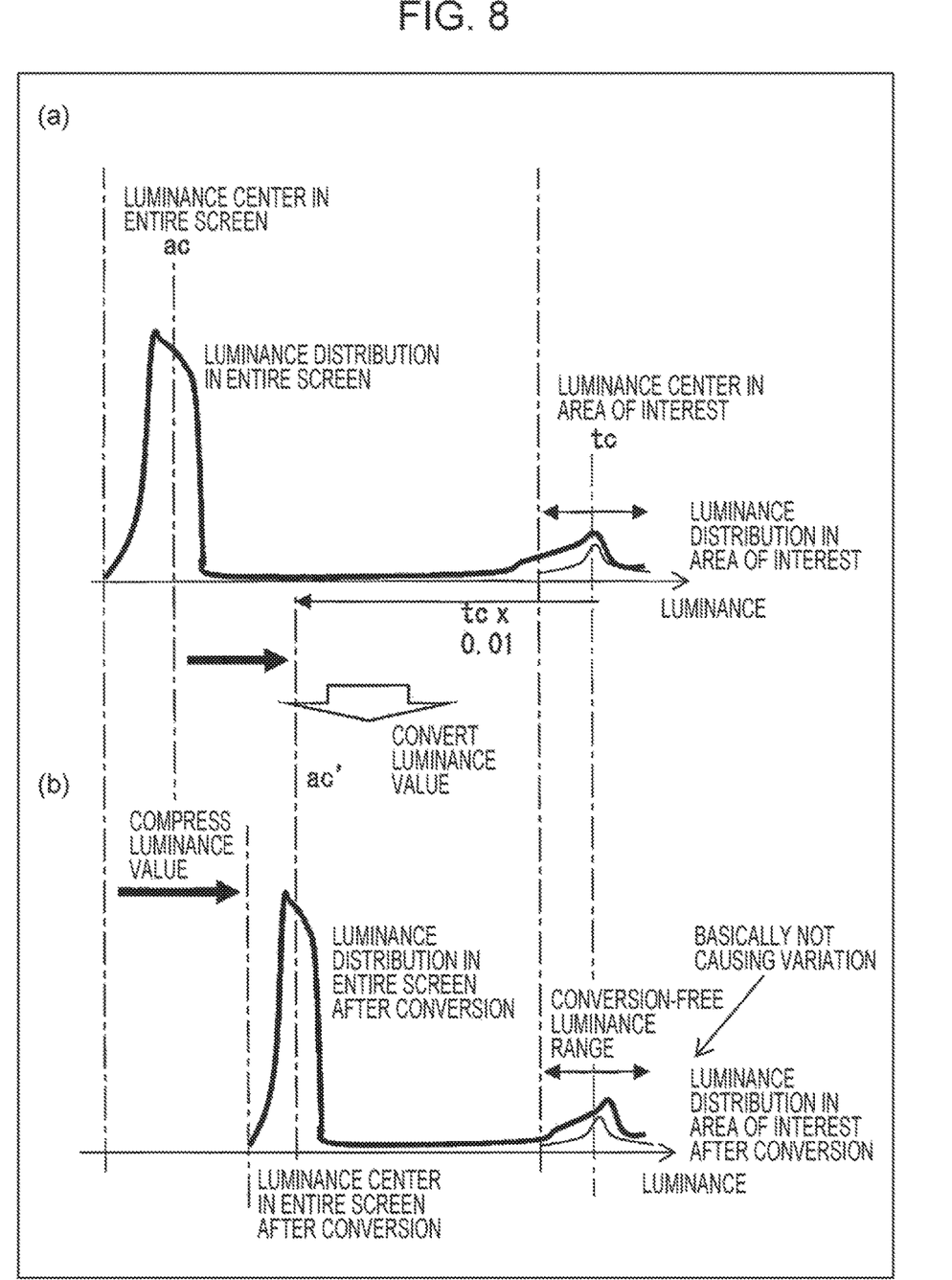

FIG. 8 illustrates graphs of luminance value conversion of a luminance distribution in which the mean luminance of the area of interest is higher than the mean luminance of the display region in the entire display screen, wherein FIG. 8(a) illustrates the graph of the luminance distribution in the entire screen prior to the luminance value conversion i and FIG. 8(b) illustrates the graph of the luminance distribution in the entire screen subsequent to the luminance value conversion.

FIGS. 7 and 8 are graphs that result from measuring the luminance distribution in the display region of the entire display screen and are thus distribution maps summarizing the luminance values of all pixels in the entire screen. In these graphs, the horizontal axis represents luminance values and the vertical axis represents the number of pixels. The "luminance center of the entire screen: ac" in FIG. 7 represents the mean value of the collected luminance values. The "luminance center of the area of interest: tc" in FIG. 7 represents the mean value of the luminance values of all pixels in the area of interest A.

When an image is input (step S11), the image is displayed on the display unit 20. At this timing, the controller 10 identifies a point of interest (step S12). Specifically, toe camera 30 captures an image of the eyeballs of the user 1 who is watching, the location of the eyeballs is identified, and the point of interest P on the screen watched by the user 1 is identified from the location of the eyeballs.

The controller 10 then identifies an area of interest (step S13). Specifically, the controller 10 causes markers to be displayed at the four corners and the central point of the screen, the user 1 aligns the line of sight with the markers, and the controller 10 recognizes the movement of the eyeballs (irises) on the screen. The controller 10 thus estimates a viewing distance. Based on the estimated viewing distance and the coordinates of the point of interest identified in step S12, the controller 10 identifies as the area of interest an area within a viewing angle of 5° with respect to the line of sight of the user.

The controller 10 then converts an image signal input in step S11 into the luminance value (step S14). In this way, the controller 10 acquires information on the luminance distribution information (ac and tc) (step S15). Here, ac represents the luminance center value of the luminance distribution in the display region of the entire display screen and tc represents the luminance center value of the luminance distribution in the area of interest.

The following discussion is based on the assumption that the luminance center value in the area of interest is smaller than (darker in display than) one-hundredth of the luminance center value of the entire screen.

The controller 10 determines whether ac acquired in step S15 is 100 times higher than to (step S16). As previously described, the dynamic range of the human vision characteristics with the adaptation of the retina and pupil excluded is about 2 digits. If the mean luminance of the entire screen is different from the mean luminance of the area of interest (the area defined by a viewing angle of 5° with respect to the point of interest) by 2 digits, the perceptibility of the display content in the area of interest is considered to be degraded.

If the determination result in step S16 is YES, namely, if ac is 100 times larger than tc, the perceptibility of the display content in the area of interest is considered to be degraded. Image correction is performed on the input image data (step S17) and the image is displayed in accordance with the corrected image data (step S18). The luminance of the entire screen is varied in accordance with the mean luminance of the area of interest. Specifically, as illustrated in FIG. 7(a), if ac>tc×100, the conversion operation is performed such that the center value of the luminance of the entire screen is tc×100. Also, the luminance conversion is performed on the luminance value higher than a luminance value on a higher luminance side of the luminance center value of the area of interest such that all the luminance values of the pixels in the entire screen become lower as illustrated in FIG. 7(b).

On the other hand, if the determination result in step S16 is NO, namely, if ac is not 100 times larger than tc, the perceptibility of the display content in the area of interest is not considered to be degraded. The image is displayed with the image correction not performed (step S18).

If the display unit 20 determines that there is no area of interest with multiple lines of sight detected or no line of sight determined (the user fails to watch the screen for a predetermined period of time), the image is displayed in accordance with the input image data with the image correction not performed on the input image data.

If the luminance center value in the area of interest is 100 times higher than the luminance center value in the entire screen (brighter in display), the operations in steps S11 through S15 in FIG. 6 are also performed in the same way. In step S16, the controller 10 determines whether ac is smaller than one-hundredth of tc. If the controller 10 determines that ac is smaller than one-hundredth of tc, the image correction is performed (step S17), and the image displaying is performed (step S18). If the controller 10 determines that ac is not smaller than one-hundredth of tc, the image displaying is performed with the image connection not performed (step S18).

The image correction in step S17 is performed as below. Referring to FIG. 8(a), if ac<tc×0.01, the conversion is performed such that the luminance center value of the entire screen is tc×0.01. Referring to FIG. 8(b), the luminance conversion is performed such that the luminance value lower than a luminance value on a lower luminance side of the luminance center value of the area of interest is increased in a manner free from display quality degradation as illustrated in rig. 8(b).

Specific Example of the Luminance Conversion

A specific example of the luminance conversion is described below.

Since the luminance value is not linear in the human vision characteristics, the luminance value is converted to a value that matches the human vision characteristics (a value that is considered to be almost linear in the human vision characteristics). For example, this conversion may be performed in accordance with HLG transfer functions illustrated in FIGS. 4 and 5. Herein, a generalized function of a luminance to linear vision characteristic conversion function is expressed as $$E'=f(L)$$

where E' is a value corresponding to a vision characteristic linear level and corresponds to a value having linear characteristics with the human vision characteristics, and L represents a display luminance value. As previously described, ac is the luminance center value of the luminance distribution in the display region of the entire display screen and tc is the luminance center value of the luminance distribution in the area of interest.

(1) The luminance conversion (with ac>tc×100) is described below. Let L represent the luminance prior to the conversion and let L' represent the luminance subsequent to the luminance conversion (compression), and the following equations hold:

$$L'=L(L \leq f^{-1}(f(tc)+0.1)) \text{ and}$$

$$L'=f^{-1}(\alpha f(t))(L > f^{-1}(f(tc)+0.1))$$

where α represents a compression rate and $f^{-1}( )$ represents ah inverse transform to $f( )$.

Also, α is a function of luminance and expressed as below.

$$\alpha = pf(L)+q$$

where p and q are calculated from f(tc), f(ac), and f(tc×100) as expressed below.

$$p=(1-f(tc \times 100)/f(ac))/(f(tc)+0.1-f(ac))$$

$$q=(f(ac)-f(tc)+0.1) \times f(tc \times 100)/f(ac)-(f(tc)+0.1))$$

(2) The luminance conversion (with ac<tc×0.01) is described next. Let L represent the luminance prior to the conversion and let L' represent the luminance subsequent to the luminance conversion (compression), and the following equations hold:

$$L'=f^{-1}(\alpha f(L))(L \leq f^{-1}(f(tc)-0.1)) \text{ and}$$

$$L'=L(L > f^{-1}(f(tc)-0.1))$$

where α represents a compression rate and $f^{-1}( )$ represents an Inverse transform to $f( )$.

Also, α is a function of luminance and expressed as below.

$$\alpha = pf(L)+q$$

where p and q are calculated from f(tc), f(ac), and f(tc×0.01) as expressed below.

$$p=(1-f(tc \times 0.01)/f(ac))/(f(tc)-0.1-f(ac))$$

$$q=(f(ac)-(f(tc) \times 0.01 \times (f(tc)-0.1)))/(f(ac)-(f(tc)-0.1))$$

By performing the luminance conversion L→L' on all pixels in the entire screen, the perceptibility to the area of interest may be increased.

Advantages

Figure 9:
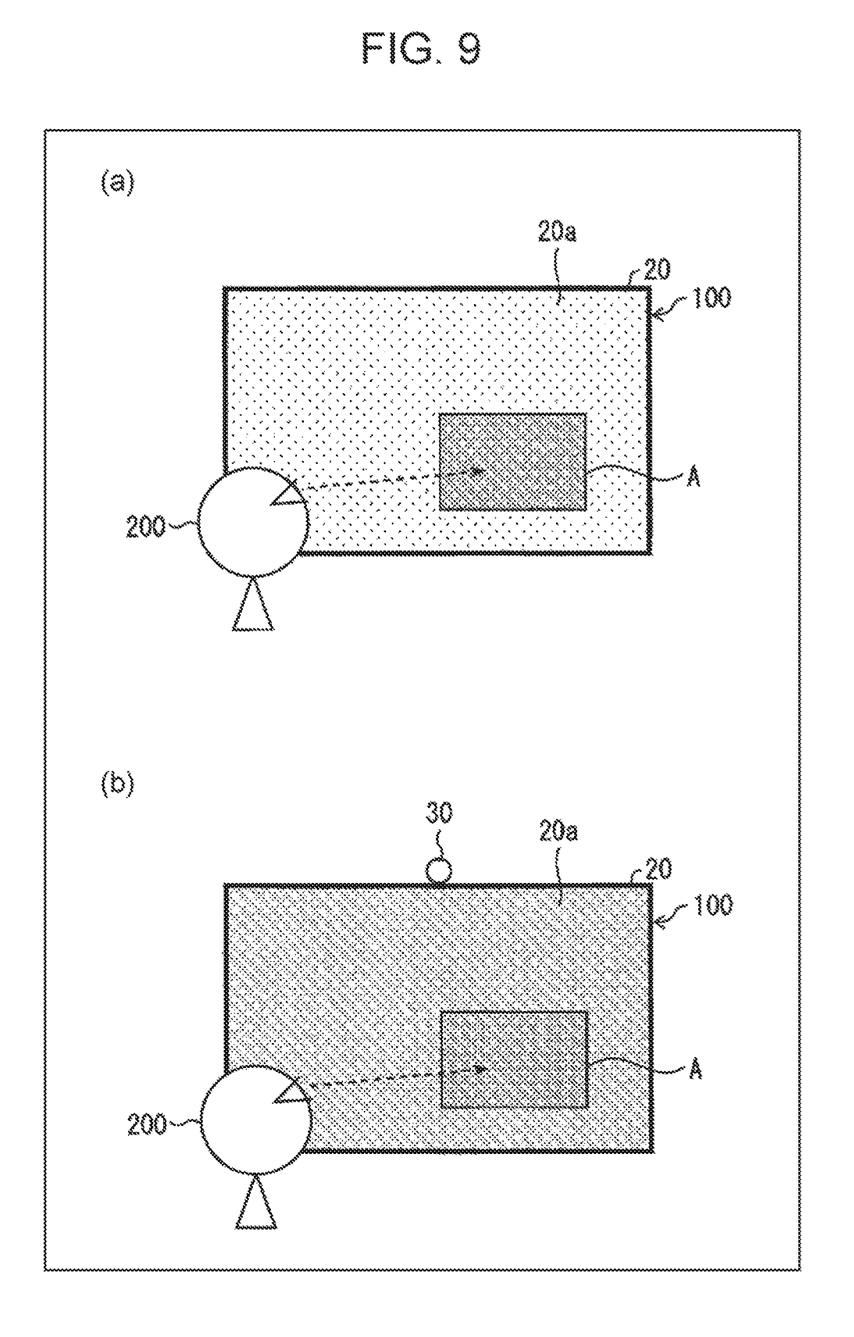
FIG. 9 illustrates the advantage of the HDR display of the embodiment.

FIG. 9(*a*) illustrates an HDR display that is compared with the HDR display of the embodiment and FIG. 9(*b*) Illustrates the HDR display of the embodiment. The area of interest A is defined by a circle formed by an angle of 5° with respect to the line of sight of the user. The screen display displayed on a monitor is typically a rectangular region, such as a window screen. In view of this, the area of interest A is rectangular in FIG. 9 for convenience of explanation. Note that the area of interest A is the circle formed by an angle of 5° with respect to the line of sight of the user but the target for image processing is a rectangular region containing the circle at the center of the region.

Referring to FIGS. 9(*a*) and 9(*b*), the overall dynamic range of the entire screen is high in the HDR display 100. If the display region 20*a* surrounding the area of interest A is too bright with contrast and luminance high in the comparative example of the HDR display 100 as illustrated in FIG. 9(*a*), the luminance difference of an image in the area of interest A is difficult to recognize. In such a case, the resulting luminance distribution is illustrated as in FIG. 7(*a*). In contrast, if the image in the area of interest A that the user watches is dark in the HDR display 100 of the embodiment as illustrated in FIG. 9(*b*), the luminance of the display region 20*a* is lowered in view of the luminance distribution in the area of interest A and the luminance difference of the image in the area of interest A is easy to recognize. In this case, the resulting luminance distribution is illustrated in FIG. 7(*b*). Specifically, the overall dynamic range of the entire display region 20*a* is low, and contrast and luminance are low in the HDR display 100 of the embodiment. The detail of the image displayed in the area of interest A is recognizable even if the area of interest A is slightly dark.

In accordance with the exemplary embodiment, the viewing distance, namely, the distance from the user to the HDR display 100 is estimated by displaying the markers at the four corners and the central point of the screen, by allowing the user to track the markers with the line of sight, and by recognizing the movement of the eyeball (iris). The present invention is not limited to this method. The viewing distance may be estimated by using another method. A second embodiment relates to another estimation method of the viewing distance.

Second Embodiment

A second embodiment of the present invention is described below. For convenience of explanation, elements having functions identical to those of elements described with reference to the first embodiment are designated with the same reference symbols and the discussion thereof is omitted herein.

Figure 10:
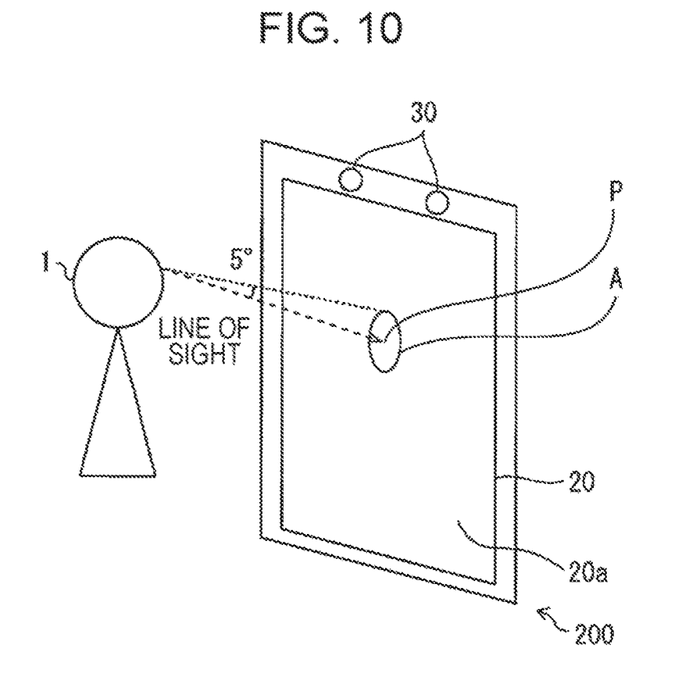
FIG. 10 illustrates an HDR display of a second embodiment of the present invention that a user watches.

FIG. 10 illustrates the state of a HDR display 200 of the second embodiment that the user watches.

The HDR display 200, different from the HDR display 100 of the first embodiment, includes two cameras 30 spaced apart from each other by a predetermined distance on a top portion of the display unit 20 as illustrated in FIG. 10.

The viewing distance, namely, the distance between the user 1 and the HDR display 200 is estimated by using the two cameras 30. Specifically, the viewing distance is estimated in accordance with triangulation by using the two cameras 30. For example, the viewing distance is determined in accordance with D=B×f/S, where B represents a distance between the cameras 30 and 30, f represents a focal length of the camera 30, and S represents a difference between imaging locations (parallax). Parallax S is determined by stereo-matching the images of the user 1 imaged by the two cameras 30. The stereo-matching is a widely known technique and the discussion thereof is omitted herein.

As described above, the HDR display 200 of the second embodiment estimates the viewing distance and the user 1 is free from tracking the markers displayed on the display unit 20. The workload on the user 1 may thus be reduced.

According to the first and second embodiments, the line of sight of the user 1 is tracked by analyzing the image that the camera 30 captures via visible light. In a third embodiment described below, the line of sight of the user 1 is tracked by analyzing the image that the camera 30 captures by using infrared light.

Third Embodiment

The third embodiment of the present invention is described below. For convenience of explanation, elements having functions identical to those of elements described with reference to the first embodiment are designated with the same reference symbols and the discussion thereof is omitted herein.

Figure 11:
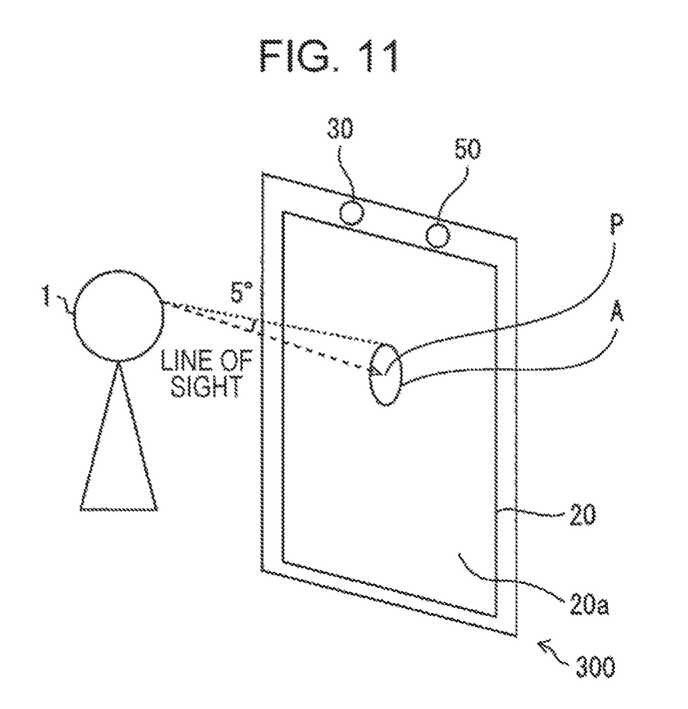
FIG. 11 illustrates the HDR display of a third embodiment of the present invention that the user watches.

FIG. 11 illustrates an HDR display 300 of the third embodiment of the present invention that the user watches.

Figure 12:
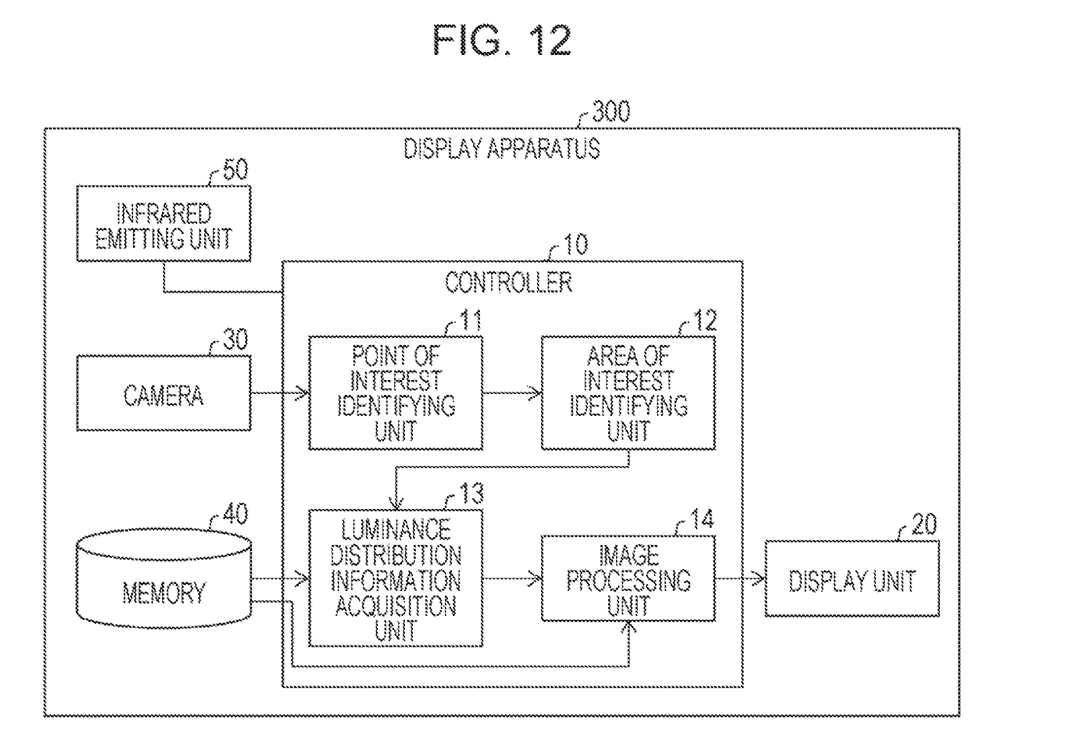
FIG. 12 is a schematic block diagram of the HDR display in FIG. 10.

FIG. 12 is a schematic block diagram of the HDR display 300 in FIG. 11.

The HDR display 300, different from the HDR display 100 of the first embodiment, includes an infrared emitting unit 50 emitting an infrared ray to the user 1 in addition to the camera 30 on the top portion of the display unit 20 as illustrated in FIG. 11.

The infrared emitting unit 50 includes an infrared LED and emits an infrared ray to the user 1. In particular, the infrared ray is directed to the eyes of the user 1. In this way, the infrared ray emitted is reflected from the retina of the user 1. The infrared ray emitted from the infrared emitting unit 50 is reflected from the retina of the user 1 and the eyes of the user 1 are thus imaged by the camera 30. The line of sight of the user 1 is tracked by using the captured image.

Specifically, the face of the user 1 is photographed by the camera 30 while the infrared emitting unit 50 radiates the face of the user 1 with the infrared ray. The captured image includes a retinal reflection point at which the infrared ray is reflected from the retina and the pupil. If the pupil is determined to be aligned to the left, right, up or down with the retinal reflection point serving as a reference point, the direction of the line of sight of the user 1 is determined For example, if the pupil is aligned off the retinal reflection point of the left eye and closer to the outer corner of the left eye of the user 1, the user 1 is determined to look at the leftward portion of the display unit 20. If the pupil is aligned off the retinal reflection point of the left eye and closer to the inner corner of the left eye of the user 1, the user 1 is determined to look at the rightward portion of the di play unit 20.

Since the retinal reflection point serving as the reference point is easy to accurately detect in the image processing, the accuracy of the tracking of the line of sight is increased. In this way, the area of interest A that the user 1 is watching is appropriately identified.

Modifications

In accordance with the third embodiment, the HDR display 300 includes the camera 30 and the infrared emitting unit 50 as illustrated in FIG. 11. Alternatively, the infrared emitting unit 50 may added to the HDR display 200 having the two cameras 30.

Since the viewing distance of the user 1 is easily and accurately determined in such a case, the accuracy of the line of sight tracking of the user 1 is even more increased.

Conclusions

The display device of a first aspect of the present invention includes the display panel (the display unit 20), the area of interest identifying unit 12 that identifies out of the display region 20a of the entire display screen of the display panel (20), the area of interest A that the user watches, and the display controller (the image processing unit 14) that, if the number of digits of the difference between the luminance center value of the luminance distribution in the area of interest A identified by the area of interest identifying unit 12 and the luminance center value of the luminance distribution in the display region 20a of the entire display screen is equal to or above the predetermined number of digits, performs a luminance conversion on the luminance value of each pixel in as entire screen in a manner such that the luminance center value of the luminance distribution in the display region 20a of the entire display screen approaches the luminance center value of the luminance distribution in the area of interest A.

If the number of digits of the difference between the luminance center value of the luminance distribution in the area of interest in the display region of the display screen and the luminance center value of the luminance distribution in the display region of the entire display screen is equal to or above the predetermined number of digits, the luminance conversion operation is performed on the luminance value of each pixel in the entire screen in a manner such that the luminance center value of the luminance distribution in the display region of the entire display screen approaches the luminance center value of the luminance distribution in the area of interest. A difference in brightness between the area of interest of the user and the display region of the entire display screen is thus reduced. In this way, the area of interest of the user is less affected by the luminance of the display region of the entire display screen and the luminance difference of an image displayed on the area of interest is easier to recognize. In particular, if the area of interest of the user is darker than the display region of the entire display region, the above process is effective.

The predetermined number of digits is desirably 2 or higher. This is determined in view of the human vision characteristics. Although the predetermined number of digital is desirably 2 or higher, the number of digits of 2 or lower may also be acceptable.

In the display device of a second aspect of the present invention in view of the first aspect, if the luminance center value of the luminance distribution in the area of interest A is lower than the luminance center value of the luminance distribution in the display region 20a of the entire display screen, the display controller (the image processing unit 14) may perform the luminance conversion to reduce the luminance value of each pixel in the entire screen in a manner such that the luminance center value of the luminance distribution in toe display region 20a of the entire display screen approaches the luminance center value of the luminance distribution in the area of interest A.

In the configuration described above, if the luminance center value of the luminance distribution in the area of interest is lower than the luminance center value of the luminance distribution in the display region of the entire display screen, the display controller performs the luminance conversion to reduce the luminance value of each pixel in the entire screen in a manner such that the luminance center value of the luminance distribution in the display region of the entire display screen approaches the luminance center value of the luminance distribution in the area of interest. Even if the area of interest of the user is darker than the display region of the entire display screen, the luminance difference of the area of interest of the user is easily recognized. Specifically, the following conversion is performed.

In the display device of a third aspect in view of the second aspect, the luminance conversion of the display region in the entire display screen may include reducing the luminance value of each pixel having a luminance value higher than a luminance value on a higher luminance side of the luminance center value of the luminance distribution in the area of interest to a luminance value lower than the luminance value of the pixel.

In the display device of a fourth aspect in view of The third aspect, the luminance conversion of the display region in the entire display screen may be expressed by $$L'=L(L\leq f^{-1}(f(tc)+0.1)) \text{ and}$$

$$L'=f^{-1}(\alpha f(L))(L>f^{-1}(f(tc)+0.1)),$$

where L represents luminance prior to the luminance conversion, L' represents luminance subsequent to the luminance conversion (compression), α represents a compression rate, and $f^{-1}(\ )$ represents inverse transform to $f(\ )$.

In the display device of a fifth aspect in view of the first aspect, if the luminance center value of the luminance distribution the area of interest A is higher than the luminance center value of the luminance distribution in the display region 20a of the entire display screen, the display control-controller (the image processing unit 14) may perform the luminance conversion to increase the luminance value of each pixel in the entire screen in a manner such that the luminance center value of the luminance distribution in the display region 20a of the entire display screen approaches the luminance center value of the luminance distribution in the area of interest A.

In the configuration described above, if the luminance center value of the luminance distribution in the area of interest is higher than the luminance center value of the luminance distribution the display region of the entire display screen, the display controller performs the luminance conversion in a manner such that the luminance center value of the luminance distribution in the display region of the entire display screen approaches the luminance center value of the luminance distribution in the area of interest. Even if the area of interest of the user is brighter than the display region of the entire display screen, the luminance difference in the area of interest is easily recognized.

In the display device of a sixth aspect in view of the fifth aspect, the luminance conversion of the display region in the entire display screen may include increasing the luminance value of each pixel having a luminance value lower than a luminance value on a higher luminance side of the luminance center value of the luminance distribution in the area of interest to a luminance value higher than the luminance value of the pixel.

In the display device of a seventh aspect in view of the sixth aspect, the luminance conversion of the display region in the entire display screen may be expressed by $$L'=L(L\leq f^{-1}(f(tc)-0.1)) \text{ and}$$

$$L'=f^{-1}(\alpha f(L))(L>f^{-1}(f(tc)-0.1)),$$

wherein L represents luminance prior to the luminance conversion, L' represents luminance subsequent to the luminance conversion (compression), α represents a compression rate, and $f^{-1}(\ )$ represents inverse transform to $f(\ )$.

The display device of an eighth aspect in view of one the first through seventh aspects may further include an imaging device (the camera 30) that captures an image of at least an expression of eyes of a user. The area of interest identifying unit 12 identifies from the image captured by the imaging device (the camera 30) the area of interest A that the user 1 watches.

In the configuration described above, the area of interest that the user watches is easily identified by using the imaging device that captures the image of at least the expression of the eyes of the user.

In the display device of a ninth aspect in view of the eighth aspect, the number of the imaging devices (the camera 30) may be two and the two imaging devices may capture the image of at least the expression of the eyes of the user 1.

In the configuration described above, the two imaging devices are used to photograph the user. The distance (the viewing distance) from the user to the display panel is measured from the captured image.

The display device of a tenth aspect in view of the eighth and ninth aspects may further include the infrared emitting unit 50 that emits an infrared ray to the user. The imaging device (the camera 30) captures the image of at least the expression of the eyes of the user 1 who is irradiated with the infrared ray emitted from the infrared ray emitting unit 50.

In the configuration described above, the captured image includes the retinal reflection point where the infrared ray is reflected on the retina and the pupil in the eye of the user. If the pupil is off the retinal reflection point serving as a reference point and aligned closer to the outer corner of the eye of the user from the retinal reflection point, the user is determined to look at the leftward portion of the display panel. If the pupil is off the retinal reflection point serving as a reference point and aligned closer to the inner corner of the eye of the user, the user is determined to look at the rightward portion of the display panel.

The retinal reflection point serving as the reference point is easy to detect accurately and the tracking accuracy of the line of sight is thus increased.

In the display device of an eleventh aspect in view of the first through tenth aspects, the display device is an HDR (High Dynamic Range) display device.

The present invention is particularly useful when the display device is an HDR (High Dynamic Range) having a maximum luminance of 1000 nits or higher.

The present invention is not limited to the embodiments described above. A variety of modifications is possible within the scope described in the claims and an embodiment that is implemented by combining technical units disclosed in each of the different embodiments also falls within the technical scope of the present invention. A new technical feature may be provided by combining the technical units disclosed in each of the different embodiments.

REFERENCE SIGNS LIST

10 Controller
11 Point of interest identifying unit
12 Area of interest identifying unit
13 Luminance distribution information acquisition unit
14 Image processing unit (display controller)
20 Display unit (display panel)
20a Display region
30 Camera (imaging device)

40 Memory.
50 Infrared emitting unit
100 HDR display (display device)
200 HDR display (display device)
300 HDR display (display device)
A Area of interest
D Viewing distance
P Point of interest

The invention claimed is:

1. A display device comprising:
a display panel,
an area of interest identifying unit that identifies, out of a display region of an entire display screen of the display panel, an area of interest that a user watches, and
a display controller that, if a number of digits of a difference between a luminance center value of a luminance distribution in the area of interest identified by the area of interest identifying unit and a luminance center value of a luminance distribution in the display region of the entire display screen is equal to or above a predetermined number of digits, performs a luminance conversion on a luminance value of each pixel in an entire screen in a manner such that the luminance center value of the luminance distribution in the display region of the entire display screen approaches the luminance center value of the luminance distribution in the area of interest.

2. The display device according to claim 1, wherein if the luminance center value of the luminance distribution in the area of interest is lower than the luminance center value of the luminance distribution in the display region of the entire display screen, the display controller performs the luminance conversion to reduce the luminance value of each pixel in the entire screen in a manner such that the luminance center value of the luminance distribution in the display region of the entire display screen approaches the luminance center value of the luminance distribution in the area of interest.

3. The display device according to claim 2, wherein the luminance conversion of the display region in the entire display screen includes reducing the luminance value of each pixel having a luminance value higher than a luminance value on a higher luminance side of the luminance center value of the luminance distribution in the area of interest to a luminance value lower than the luminance value of the pixel.

4. The display device according to claim 3, wherein the luminance conversion of the display region in the entire display screen is expressed by $L'=L(L\,f{-}1(f(tc)+0.1))$ and $L'=f{-}1(f(L))(L>f{-}1(f(tc)+0.1))$, and wherein L represents luminance prior to the luminance conversion, U represents luminance subsequent to the luminance conversion (compression), represents a compression rate, and f–( ) represents inverse transform to f( ).

5. The display device according to claim 1, wherein if the luminance center value of the luminance distribution in the area of interest is higher than the luminance center value of the luminance distribution in the display region of the entire display screen the display controller performs the luminance conversion to increase the luminance value of each pixel in the entire screen in a manner such that the luminance center value of the luminance distribution in the display region of the entire display screen approaches the luminance center value of the luminance distribution in the area of interest.

6. The display device according to claim 5, wherein the luminance conversion of the display region in the entire display screen includes increasing the luminance value of each pixel having a luminance value lower than a luminance value on a higher luminance side of the luminance center value of the luminance distribution in the area of interest to a luminance value higher than the luminance value of the pixel.

7. The display device according to claim 6, wherein the luminance conversion of the display region in the entire display screen is expressed by $L'=L(L\,f{-}1(f(tc){-}0.1))$ and $L'=f{-}1(f(L))(L>f{-}1(f(tc){-}0.1))$, and wherein L represents luminance prior to the luminance conversion, U represents luminance subsequent to the luminance conversion (compression), represents a compression rate, and f–( ) represents inverse transform to f( ).

8. The display device according to claim 1, further comprising an imaging device that captures an image of at least an expression of eyes of a user,
wherein the area of interest identifying unit identifies from the image captured by the imaging device the area of interest that the user watches.

9. The display device according to claim 8, wherein a number of the imaging devices is two and the two imaging devices capture the image of at least the expression of the eyes of the user.

10. The display device according to claim 8, further comprising an infrared emitting unit that emits an infrared ray to the user,
wherein the imaging device captures the image of at least the expression of the eyes of the user who is irradiated with the infrared ray emitted from the infrared ray emitting unit.

11. The display device according to claim 1, wherein the display device is an HDR (High Dynamic Range) display device.

* * * * *